(12) United States Patent
Dehner et al.

(10) Patent No.: US 9,087,003 B2
(45) Date of Patent: Jul. 21, 2015

(54) VECTOR NCO AND TWIDDLE FACTOR GENERATOR

(71) Applicants: Leo G. Dehner, Austin, TX (US); Oded Yishay, Austin, TX (US)

(72) Inventors: Leo G. Dehner, Austin, TX (US); Oded Yishay, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 336 days.

(21) Appl. No.: 13/666,289

(22) Filed: Nov. 1, 2012

(65) Prior Publication Data

US 2014/0122553 A1 May 1, 2014

(51) Int. Cl.
*G06F 17/14* (2006.01)
*G06F 1/03* (2006.01)

(52) U.S. Cl.
CPC ............ *G06F 17/142* (2013.01); *G06F 1/0328* (2013.01); *G06F 17/14* (2013.01)

(58) Field of Classification Search
USPC .................................. 708/270–271, 400–409
See application file for complete search history.

(56) References Cited

U.S. PATENT DOCUMENTS

| 4,893,316 | A | * | 1/1990 | Janc et al. ...................... 708/300 |
| 2001/0051966 | A1 | * | 12/2001 | Pelton et al. ................... 708/270 |
| 2006/0224651 | A1 | * | 10/2006 | Madhavapeddi et al. ..... 708/404 |
| 2007/0106718 | A1 | | 5/2007 | Shum et al. |
| 2010/0070551 | A1 | | 3/2010 | Chen et al. |

OTHER PUBLICATIONS

J. Chi et al., An Efficient FFT Twiddle Factor Generator, http://www.eurasip.org/Proceedings/Eusipco/Eusipco2004/defevent/papers/cr1714.pdf, 2004.

* cited by examiner

*Primary Examiner* — Chuong D Ngo
*Assistant Examiner* — Calvin M Brien
(74) *Attorney, Agent, or Firm* — Terrile, Cannatti, Chambers & Holland, LLP; Michael Rocco Cannatti

(57) ABSTRACT

A method and apparatus may be used to generate complex exponentials for either frequency domain or time domain applications by programming input parameter values into a complex exponential vector generator (260) having a frequency generator stage (281) and a vector phase accumulator stage (282) arranged with a vector element multiplier stage (283) to generate complex exponential phase index values ($\alpha_0, \alpha_1, \ldots \alpha_{v-1}$) that are processed by a complex exponential generator stage (284) to output a plurality of complex exponential values (e.g., $e^{j2\pi\alpha_0}, e^{j2\pi\alpha_1}, \ldots e^{j2\pi\alpha_{v-1}}$) that may be rearranged by a permutation unit (286) for use by vector data path.

21 Claims, 5 Drawing Sheets

VECTOR NCO AND TWIDDLE FACTOR GENERATOR

BACKGROUND OF THE INVENTION

1. Field of the Invention

The present invention is directed in general to field of information processing. In one aspect, the present invention relates to the generation of complex exponentials for use in frequency domain processing and time domain processing.

2. Description of the Related Art

Signal processing applications increasingly require the use of complex exponentials for different frequency domain and time domain applications. For example. 3GPP long term evolution (LTE) requires over 40 different sizes of Fourier transforms, such as Discrete Fourier Transforms (DFTs) and Fast Fourier Transforms (FFTs), which use complex exponentials to compute the Fourier transforms in the frequency domain. In computing such Fourier transforms, twiddle factors are generated as trigonometric constant coefficients that are typically stored in lookup tables and multiplied by the data being transformed. Complex exponentials may also be used in time domain applications, such as time domain mixer, which generate digital signals using a numerically controlled oscillator or other digital signal generator. While existing solutions have computed Fourier transforms by generating complex exponentials as twiddle factors that are stored in one or more look up tables, such solutions result in inefficient use of storage in signal processors, and are constrained to provide frequency domain solutions. And while there are other solutions which generate a scalar sequence of complex exponentials in the time domain, these solutions are not adapted to generate complex exponentials in the frequency domain. In any case, the real-time processing requirements for generating and using complex exponentials can impose significant complexity and processing costs in terms of the required digital processing resources.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
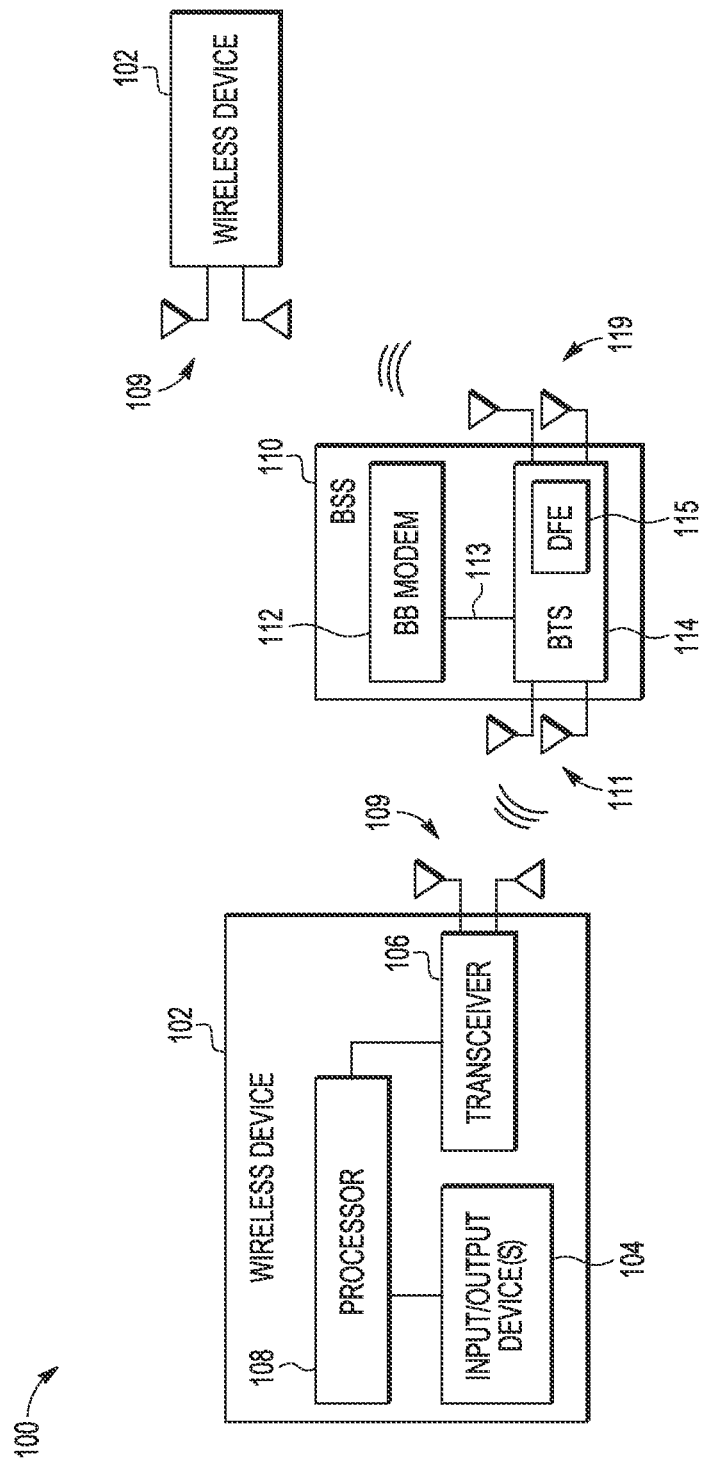
FIG. 1 is a simplified block diagram of a wireless communication system with a base station system deployed with a plurality of radio base station subsystems in accordance with selected embodiments of the present disclosure.

A system, apparatus, and methodology are described for generating a complex exponential vector sequence for either time or frequency domain applications using a complex exponential vector generator hardware unit. In selected embodiments, a single chip digital front end processor includes a programmable complex exponential vector generator hardware unit which may be programmed to generate a complex exponential sequence vector that suitable for use on a vector data path for both frequency domain and time domain algorithms. To provide a compact and efficient design, the complex exponential vector generator hardware unit may include a scalar phase accumulator and output buffer that is common to all vector elements, where the scalar phase accumulator may be programmed with at least a vector length parameter v which is accumulated over a plurality of n clock cycles. The output buffer is applied as a first addition operand to a plurality of adders in the vector element paths, each of which also receives as a second addition operand the corresponding vector element index value i=0:v−1, thereby generating a plurality of accumulated vector phase values. The complex exponential vector generator hardware unit may also include a scalar frequency generator and common frequency register that is common to all vector elements. The scalar frequency generator may include a frequency multiplier that computes the product of a base frequency parameter $f_0$ and a multiplicand parameter k to generate a true frequency for storage in the common frequency register. The common frequency register is applied as a first multiplicand operand to a plurality of multipliers in the vector element paths, each of which also receives as a second multiplicand operand the corresponding accumulated vector phase value, thereby generating a plurality of complex exponential phase index values ($\alpha_0, \alpha_1, \ldots \alpha_{v-1}$). In selected embodiments, at least a first predetermined programming instruction may be used to program the programmable complex exponential vector generator hardware unit with a first plurality of parameters to generate a plurality of complex exponentials in the frequency domain that may be used as twiddle factors to compute a Fourier transform. In addition, the programmable complex exponential vector generator hardware unit may be programmed with a second plurality of parameters by at least a second predetermined programming instruction to generate a plurality of complex exponentials in the time domain. For frequency domain applications, the first predetermined programming instruction may be used to program the scalar phase accumulator with a vector length parameter v, to program the output buffer with an initial phase parameter $\theta=0$, and to program the frequency multiplier with multiplicand parameter k corresponding to the twiddle factor spacing multiple and the base frequency parameter $f_0$. And for time domain applications, the second predetermined programming instruction may be used to program the scalar phase accumulator with a vector length parameter v, to program the output buffer with an initial phase parameter $\theta$, and to program the frequency multiplier with multiplicand parameter k=1 and the desired frequency parameter $f_0$. A complex exponential generator for each vector element path uses the received complex exponential phase index value to generate a plurality of complex exponential values (e.g., $e^{j2\pi\alpha_0}, e^{j2\pi\alpha_1}, \ldots e^{j2\pi\alpha_{v-1}}$) which are assembled into vector format by a permutation unit.

In this disclosure, an improved system, apparatus, and method are described for generating complex exponentials with a programmable complex exponential vector generator hardware unit that is compatible with a vector data path, as well as both time domain and frequency domain applications to address various problems in the art where various limitations and disadvantages of conventional solutions and technologies will become apparent to one of skill in the art after reviewing the remainder of the present application with reference to the drawings and detailed description provided herein. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Turning now to FIG. 1, there is shown a simplified block diagram of a wireless communication system 100 having a plurality of wireless devices or subscriber stations 102, 122 (e.g., hand-held computers, personal digital assistants (PDAs), cellular telephones, etc.) that wirelessly communicate with one or more base station systems (BSS) 110 (e.g., enhanced Node-B or eNB devices). Each wireless devices 102 may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102, 129 communicate with a baseband (BB) modem 112 of the base station subsystem 110 via one or more antennas 111, 119 and base transceiver stations (BTS) 114 to receive or transmit voice, data, or both voice and data. The BB modem 112 may, for example, be configured to schedule communications for the wireless devices 102, 122, and to otherwise exchange signal information with the BTS 114 over one or more communication links 113.

In the embodiments shown, the base transceiver station(s) 114 include a digital front end (DFE) processor 115 which may be implemented as a single integrated circuit to provide the digital components of the cellular base station RF subsystem. The digital components consolidated on the DFE 115 may include one or more control processors and digital transmit/receive filters, as well as interface peripherals and other I/O for RF subsystem functions. In addition and as described more fully below, the DFE 115 may include a transmit and/or receive processing path for each antenna which performs signal processing on the signal that is provided to or received from a power amplifier and associated antenna, thereby forming a separate DFE-power amplifier chain for each antenna. As will be appreciated, the digital front end circuit may also be used in connection with a multi-antenna wireless communication device, such as the wireless devices 102, 122. To this end, each wireless device 102 may also include a digital front end processor (not shown) connected to a corresponding transceiver unit 106 which includes a transmit and/or receive processing path for each antenna which performs signal processing on the transmit signal.

Figure 2A:
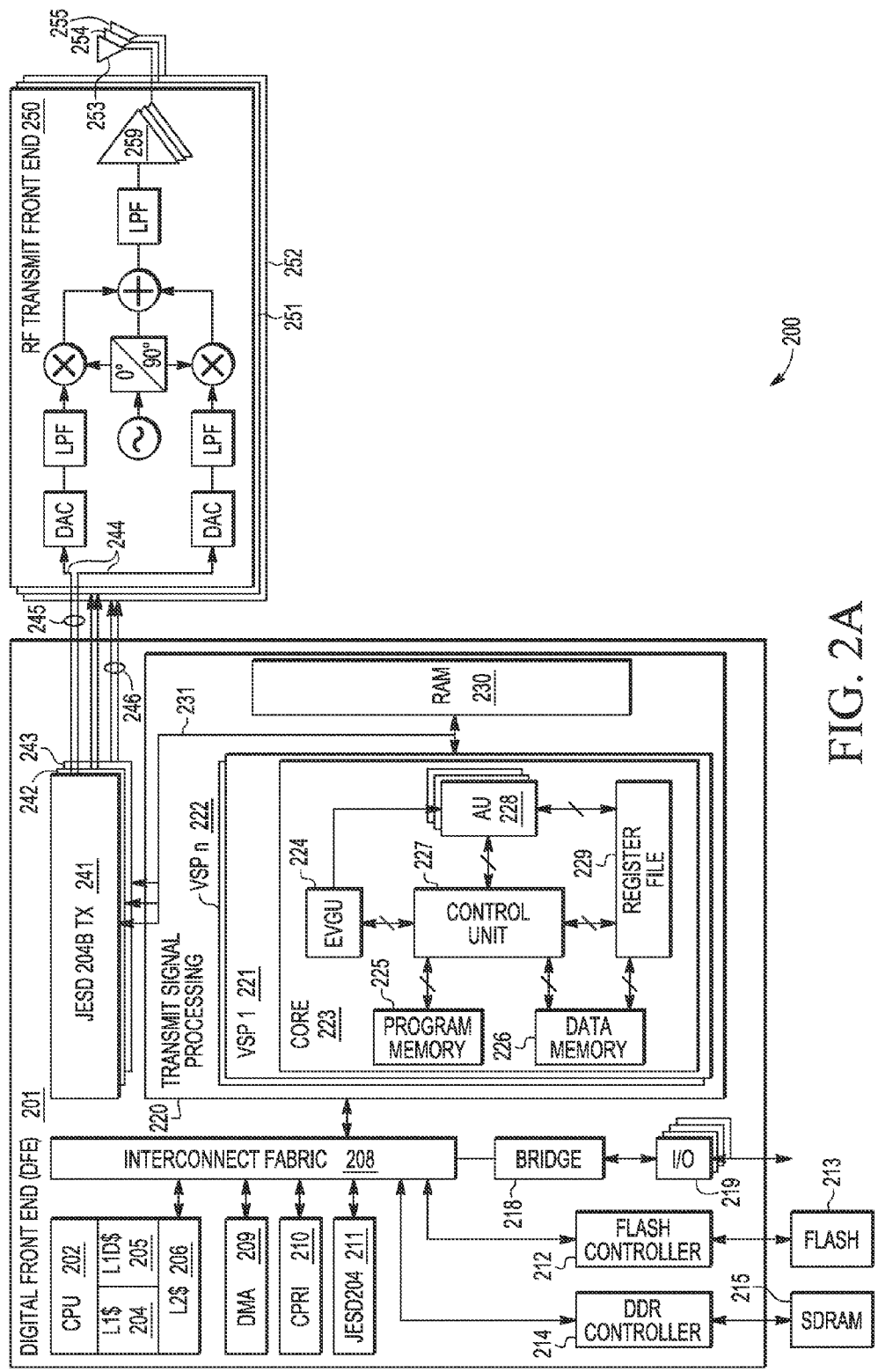
FIG. 2A is a block diagram illustration of a base station system having a multi-antenna radio frequency (RF) subsystem connected to a single chip digital front end (DFE) processor having an integrated exponential vector generator unit.

To illustrate potential applications for the programmable complex exponential vector generator hardware unit disclosed herein, reference is now made to FIG. 2A which depicts a high level architecture block diagram illustration of a multi-antenna radio frequency (RF) subsystem 200 which is connected to a base station controller (not shown), and includes a single chip digital front end (DFE) processor 201 connected to a plurality of RF transmit or transceiver front end circuits 250-252. As will be appreciated, a radio receiver front end may be understood to refer to all circuitry between the antenna and the first intermediate frequency (IF) stage, including analog and digital receiver components that process the signal at the original incoming radio frequency (RF) before it is converted to an intermediate frequency (IF). For simplicity of illustration, the transmit antennas 253-255 are shown as being connected to the respective transmit front end circuits 250-252, but it will be appreciated that the transmit antennas 253-255 may be shared for both signal transmission and reception in a shared or switched circuit arrangement.

Connected to each transmit antenna (e.g., 253) is an RF transmit front end circuit (e.g., 250) which includes RF conversion circuit components (e.g., digital-to-analog converters, low pass filters, oscillators, splitters, mixers, amplifiers, etc.) for converting and filtering the digital I and Q samples 244 output by the DFE processor 201 to a combined analog signal that is filtered and amplified (e.g., with one or more RF power amplifiers 259) for transmission by a corresponding antenna (e.g., 253). In similar fashion, each receive antenna may be connected to an RF receive front end circuit (not shown) which includes RF conversion circuit components (e.g., bandpass filters, splitters, low pass filters, oscillators, mixers, amplifiers, analog-to digital converters, etc.) that process the signal from the antenna received at the original incoming radio frequency (RF) and convert it for processing by the DFE processor 201. Though the RF front end circuits (e.g., 250) employ the depicted RF conversion and power amplifier circuit components, it will be appreciated that other RF conversion circuit arrangements and power amplifier components can be used.

The depicted digital front end (DFE) processor 201 is provided to perform digital signal processing for the RF base station subsystem 200 across the separate transmit paths to antennas 253-255. To this end, the DFE processor 201 partitions transmit signals to the antennas into transmit processing paths, and communicates with the baseband modem through the Common Public Radio Interface (CPRI) interface 210 and/or JESD204A/B interface 211. The DFE processor 201 may include one or more control processors 202 (e.g., one or more processor cores), memory subsystems (e.g., L1 instruction cache 204, L1 data cache 205, L2 cache 206), memory controllers (e.g. DMA controller 209, flash controller 212, and DDR controller 214) for interfacing with external memory (e.g., Flash memory 213, SDRAM 215), one or more modem interfaces (e.g. CPRI interface 210 and JESD204A/B interface 211), and I/O facilities (e.g., host bridge 218) for I/O devices 219. As a general matter, any of a variety of memory designs and hierarchies may be employed in, or in conjunction with, with the DFE processor 201. Also, it will be appreciated that the I/O devices 219 may include any desired I/O device, such as Ethernet. I2C, SPI, GPIO, and/or UART devices. All processor subsystems are linked by a multi-level interconnect fabric 208.

To digitally process transmit signals, the DFE processor 201 may also include a programmable transmit signal processing path for each transmit antenna 253-255 which is formed with a transmit signal processor 220 and an associated serialized interface 241-243 (e.g., a JESD204B TX interface) and RF transmit front end 250-252. The transmit signal processor 220 may include one or more processors 221-222 (e.g., vector signal processors VSP1 and VSPn) and associated memory 230 (e.g., RAM) for performing carrier-related signal processing and antenna-specific processing on IQ samples received from the baseband modem. Signal processing along each transmit signal path may be divided between the processors 221-222 and shared memory 230. For example, a first vector signal processor 221 (VSP 1) may be used to perform a first set of processing tasks and store the results in the shared RAM 230. At this point, a second vector signal processor 222 (VSP n) may be used to perform additional signal processing on the output IQ samples retrieved from shared memory 230. Once signal processing is completed, the transmit signal processor 220 may send the processed samples over a signalbuss line 231 to an associated serialized interface (e.g., JESD204B TX 241) for transfer to the transceiver (e.g., 250) over IQ signal lines 244. In this way, the first vector signal processor 221 may perform a variety of different signal processing tasks for a first antenna path formed by the connection of the transmit signal processor 220 and JESD204B TX interface 241 which are connected over IQ signal lines 244 to transceiver 250 and antenna 253.

An example signal processing task for a vector signal processor 221, 222 would be a frequency domain task, such as performing Fourier transform processing, such as DFT or FFT, whereby a time domain signal is transformed into a frequency domain signal. However, the vector signal processor 221, 222 may also be required to perform signal processing tasks in the time domain, such as using a numerically controlled oscillator to generate one or more complex exponential waveforms. To support both frequency domain and time domain processing tasks, the vector signal processor (e.g., 221) may include one or more VSP processor cores 223, each of which includes an integrated exponential vector generator unit (EVGU) 224, a program memory 225, a data memory 226, a control unit 227, one or more arithmetic units (AU) 228, and a register file 229. Control unit 227 may control the processing of signals by processor core 223. Arithmetic unit 228 may perform various arithmetic and logic operations under the direction of control unit 227. Program memory 225 may be used to store instructions, code, or other programmatic elements that may be decoded by control unit 227. As will be appreciated, program memory 225 may include both volatile and non-volatile memory components. Data memory 226 may be used to store data. Though the processor core 223 shows a specific number of elements interconnected in a specific fashion, additional and/or fewer elements may be included and interconnected in a different fashion.

Based on input from control unit 227, the exponential vector generator unit (EVGU) 224 may be used to generate complex exponentials for either frequency domain or time domain applications. By way of example, control unit 227 may decode one or more first instructions stored in program memory 225 which provide programming parameters to EVGU 224 to generate complex exponential twiddle factors that are used as multiplying factors in the arithmetic unit(s) 228. In response, the EVGU 224 may then generate appropriate twiddle factors based on the programming parameters. As used herein, the term twiddle factor includes, but is not limited to, exponential coefficients used to compute Fourier transforms, including but not limited to FFTs and DFTs. For example, a twiddle factor may have a complex value of the form: $W(k)=e^{-j2\pi ki/N}$, where N is the maximum FFT or DFT block size, k is an FFT stage index value (e.g., 0, 1, 2, . . . ), and i is a vector element index value (e.g., 0, 1, 2, . . . v−1). In one embodiment, a DFT, with a block size of N, may include mixed radixes, including radixes that are a power of 2 and 3. In addition or in the alternative, the DFT may include radixes that are a power of 2, 3, and/or 5. Twiddle factors may be generated using real and imaginary parts, such as $W(k)=\cos(2\pi k/Nmax)-j\sin(2\pi k/Nmax)$. In addition or in the alternative, control unit 227 may decode one or more second instructions stored in program memory 225 which provide programming parameters to EVGU 224 to generate a fine resolution complex exponential waveform that may be used with a time domain mixer. In response, the EVGU 224 may then generate a fine resolution complex exponential waveform based on the programming parameters.

Figure 2B:
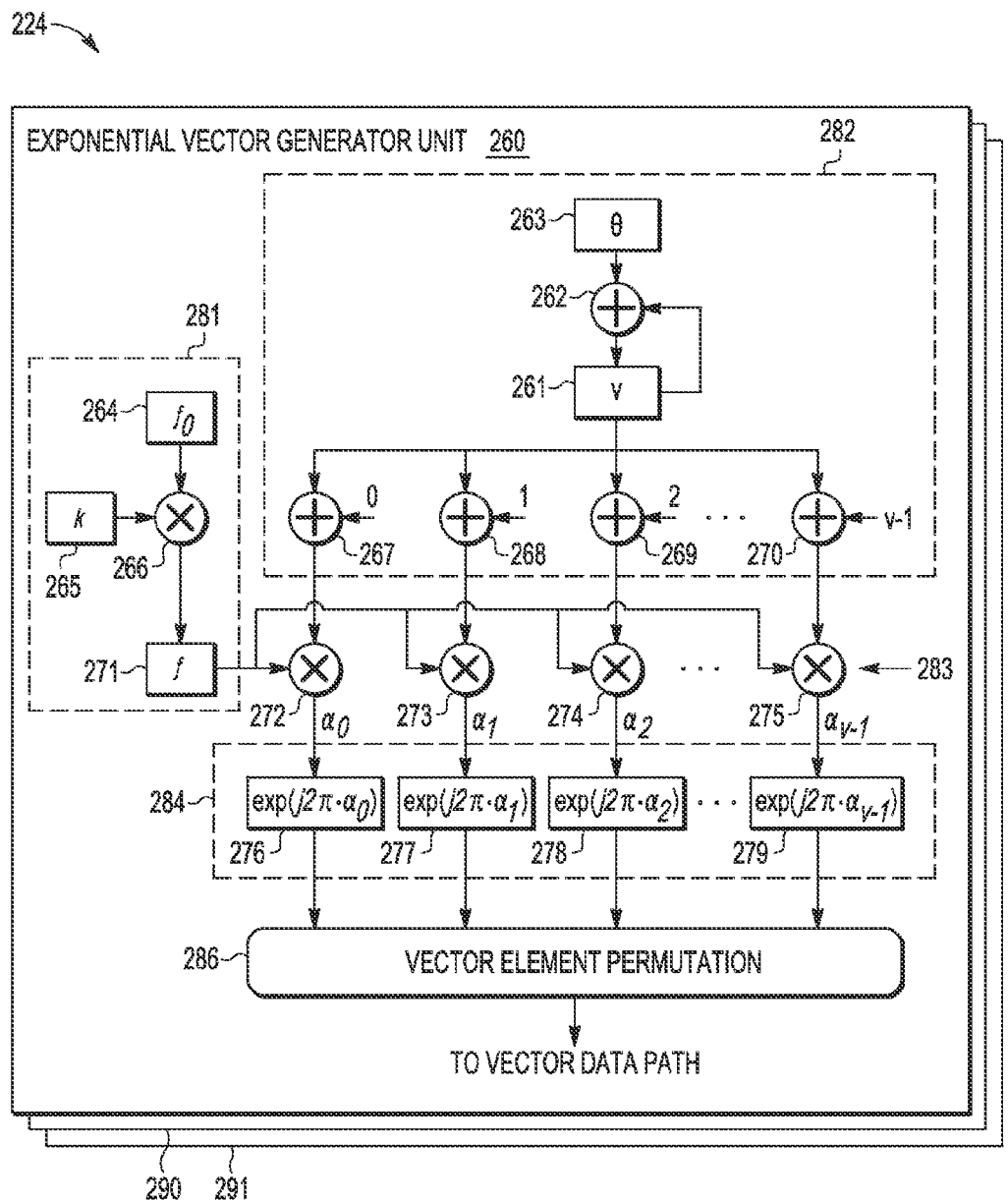
FIG. 2B is a block diagram illustration of an exponential vector generator unit hardware or firmware structure.

To implement the EVGU 224, one or more exponential vector generator unit hardware or firmware structures may be provided. To illustrate selected example embodiments, reference is now made to FIG. 2B which depicts a block diagram illustration of an exponential vector generator unit hardware or firmware structure 260 which includes a first frequency generator stage 281 and a second vector phase accumulator stage 282 arranged with a plurality of vector element multipliers 283 to generate a plurality of complex exponential phase index values ($\alpha_0, \alpha_1, \ldots \alpha_{v-1}$) that are processed by a complex exponential generator stage 284 to output a plurality of complex exponential values (e.g., $e^{j2\pi\alpha_0}, e^{2j\pi\alpha_1}, \ldots e^{j2\pi\alpha_{v-1}}$) that may be rearranged by a permutation unit 286 for use by vector data path. As will be appreciated, one or more additional exponential vector generator unit hardware or firmware structures 290, 291 may also be provided. Depending on the input parameters programmed into the EVGU hardware or firmware structures 260, the complex exponential values may be generated for either frequency domain or time domain applications. As will be appreciated, the frequency generator stage 281 and/or vector phase accumulator stage 282 may implement multiplication or addition operations with modulo-2 arithmetic rather than ordinary arithmetic, and may be implemented in software or in hardware by electrical circuitry, combinational logic, exclusive-or ("XOR") logic gates, shift registers and buffers.

In selected embodiments, the EVGU hardware/firmware structure 260 includes at least a first frequency generator stage 281 having first and second frequency parameter input registers 264, 265 connected to a frequency multiplier circuit 266 to form a scalar frequency generator. The first and second frequency parameter input registers 264, 265 may be implemented as flop storage devices which store a programmable base frequency parameter $f_0$ and multiplicand parameter k, respectively. The scalar frequency generator 266 computes the product of the base frequency parameter $f_0$ and multiplicand parameter k to generate a true frequency f for storage in an output frequency register 271. In selected embodiments, the first frequency generator stage 281 is provided in common to all vector elements in the EVGU hardware/firmware structure 260, thereby reducing processing cost, area, power, and complexity. By providing a common frequency register derived from the product of a base frequency ($f_0$) and a multiplicand (k), the number of cycles in FFT implementations may be reduced since only the multiplicand parameter k gets updated between stages (bin spacing=$f_0$). However, in other embodiments, separate frequency generator stages may be provided for each vector element, thereby providing independent frequencies to each vector element.

The EVGU hardware/firmware structure 260 may also include at least a second vector phase accumulator stage 282 having first and second vector parameter registers 263, 261 connected to an adder or accumulator circuit 262 to form a scalar phase accumulator circuit which stores the accumulator output in the second or output vector parameter register 261. The first and second vector parameter registers 263, 261 may be implemented as flop storage devices which store an initial phase parameter and vector length parameter v, respectively. By providing the second vector parameter register 261 for storing the v parameter, variable length vectors can be supported. The adder/accumulator circuit 262 computes the sum of the vector length parameter v and initial phase parameter θ and stores the sum in the second vector parameter register 261 which is fed back as an input to the adder/accumulator circuit 262. In selected embodiments, the second vector phase accumulator stage 282 is provided in common to all vector elements and programmed with at least a vector length parameter v which is accumulated over a plurality of n clock cycles, thereby reducing processing cost, area, power, and complexity. In the common vector phase accumulator stage 282 embodiments, the vector parameter register 261 may be applied as a first addition operand to a plurality of adders 267-270 in the vector element paths, each of which also receives as a second addition operand the corresponding vector element index value i=0:v−1, thereby generating a plurality of accumulated vector phase values. However, in other embodiments, separate vector phase accumulator stages may be provided for each vector element, thereby providing independent phase values to each vector element. And in yet other embodiments, the plurality of adders 267-270 may instead be implemented by re-using a shared adder.

The outputs from the first frequency generator stage 281 and second vector phase accumulator stage 282 are applied to a multiplier bank 272-275 to generate a plurality of complex exponential phase index values ($\alpha_0, \alpha_1, \ldots \alpha_{v-1}$), where a=k·$f_0$·(θ+i+v·n), with k specifying an FFT stage index value (e.g., 0, 1, 2, . . . ), $f_0$ specifying a frequency spacing for FFT, θ specifying a phase parameter, i specifying a vector element index value (e.g., 0, 1, 2, . . . v−1), v specifying a vector length, and n specifying the cycle index, starting with 0. For example, with a common frequency generator stage 281, the output frequency register 271 may be applied as a first multiplicand operand to a plurality of multipliers 272-275 in the vector element paths. Each multiplier 272-275 may also be connected to receive as a second multiplicand operand the accumulated vector phase value generated at the vector phase accumulator stage 282 by the corresponding adder 267-270 in its vector element path. With this arrangement, the plurality of multipliers 272-275 generate a corresponding plurality of complex exponential phase index values ($\alpha_0, \alpha_1, \ldots \alpha_{v-1}$). And in yet other embodiments, the plurality of multipliers 272-275 may instead be implemented by re-using a shared multiplier.

Each complex exponential phase index value ($\alpha_0, \alpha_1, \ldots \alpha_{v-1}$) may be input to a complex exponential generator stage 284 to output a plurality of complex exponential values (e.g., $e^{j2\pi\alpha_0}, e^{j2\pi\alpha_1}, \ldots e^{j2\pi\alpha_{v-1}}$). To this end, the complex exponential generator stage 284 may include a plurality of complex exponential generators 276-279 that are connected to receive the plurality of complex exponential phase index values ($\alpha_0, \alpha_1, \ldots \alpha_{v-1}$), and to generate therefrom complex exponential values (e.g., $e^{j2\pi\alpha_0}, e^{j2\pi\alpha_1}, \ldots e^{j2\pi\alpha_{v-1}}$) for the different vector elements. Each of the complex exponential generators 276-279 may use an arrangement of tables, multipliers, and adders to achieve good performance at low cost and power. To support compatibility with a vector data path employed in a vector signal processor 221, the complex exponential values may be rearranged by a permutation unit 286 for use by vector data path.

Figure 3:
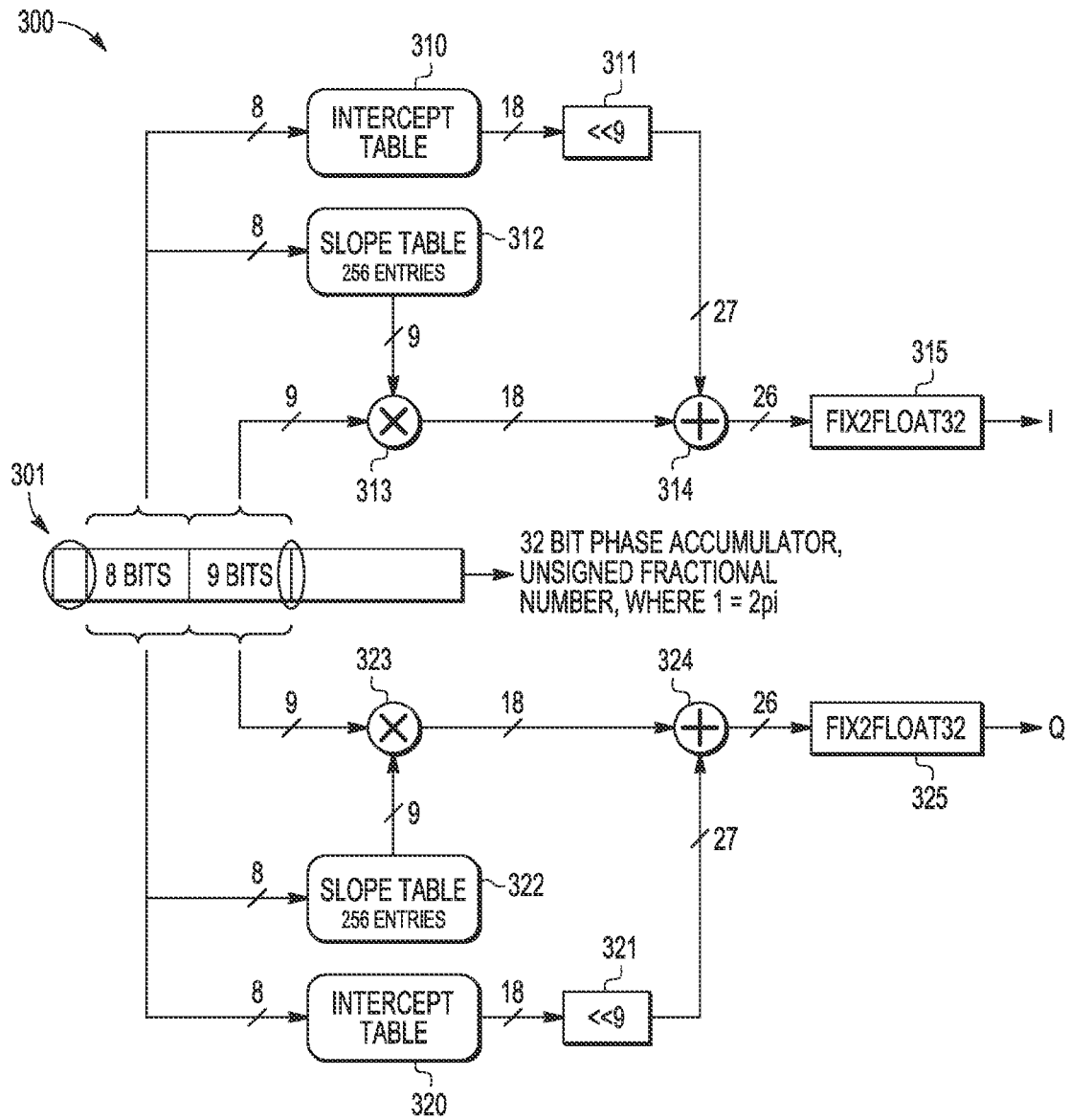
FIG. 3 is block diagram of a complex exponential generator used in the exponential vector generator unit.

Turning now to FIG. 3, there is shown a block diagram of a complex exponential generator 300 corresponding to any of the complex exponential generators 276-279 used in the exponential vector generator unit. The complex exponential generator 300 may include an input register 301 for receiving complex exponential phase index value (e.g. $\alpha_0$) having predetermined bit fields (e.g., a first field of the 3 most significant bits, a second field of the 8 next most significant bits, a third field of the 9 next most significant bits, etc.). In selected embodiments, the received complex exponential phase index value may be a 32-bit phase accumulator value that is implemented as an unsigned fractional number, where 1=2π. In other embodiments, the received complex exponential phase index value may be rounded to the sum number of bits in the first field, the second field and the third field.

The complex exponential generator 300 may also include first and second multipliers 313, 323 connected to multiply predetermined bit fields from the complex exponential phase index value with a slope value provided by first and second slope tables 312, 322, thereby generating a multi-bit product output. In an example embodiment, a first field of the 3 most significant bits from the complex exponential phase index value is used to indicate a sin/cos table and the sign of the I and Q outputs. In addition, a second field of the 8 next most significant bits may be used to index first and second multi-entry slope tables 312, 322 which each store 256 entries and output a multi-bit slope value (e.g., 9 bits). The second field of the 8 next most significant bits is also used to index first and second multi-entry intercept tables 310, 320 which each output a multi-bit intercept value (e.g., 18 bits). For example, the first entry in the cosine intercept table 310 is a value that is implemented as an unsigned fractional number, where $2^{17}$ represents the maximum value of 1.0 and $-(2^{17})$ represents the minimum value of −1.0. At each multiplier 313, 323, the received multi-bit slope values are multiplied with a third field of the 9 next most significant bits from the complex exponential phase index value, thereby generating first and second multi-bit product values (e.g., 18 bits) for the I and Q samples.

The complex exponential generator 300 may also include first and second adders 314, 324 connected to add the multi-bit product output with a shifted intercept value provided by first and second intercept tables 310, 320, thereby generating a multi-bit sum output for storage in output registers and/or for processing by fixed-to-floating point conversion circuits 315, 325. As will be appreciated, it is possible for the sum generated by the adders 314, 324 to carry out, indicating that the maximum value of 1.0 in floating point. In an example embodiment, the second field of the 8 next most significant bits is used to index first and second multi-entry intercept tables 310, 320 which each output a multi-bit intercept value (e.g., 18 bits) which is left-shifted a predetermined number of positions (e.g., 9) by an output shifter 311, 321. At each adder 314, 324, the shifted multi-bit intercept values are added with the multi-bit product outputs from the first and second multipliers 313, 323, thereby generating first and second multi-bit sum values (e.g., 26 bits) which are written as floating-point elements for the I and Q samples in each cycle. In selected embodiments, the floating-point elements may be processed by fixed-to-floating point conversion circuits 315, 325.

In selected embodiments, the first two bits from the complex exponential phase index value stored at register 301 identify the quadrant of the unit circle where the phase accumulator is located. The next bit identifies the octant of the unit circle where the phase accumulator is located. The next 17 bits are used to generate the sin/cos values using a linear interpolation circuit (y=mx+b). The top 8 bits identify the slope (m) (e.g., from the slope tables 312, 322) and y-intercept (b) (e.g., from intercept tables 310, 320 and shifters 311, 321). The next 9 bits represent the delta-x or fractional distance between the points on the x-axis (e.g., the inputs to the multipliers 313, 323). As implemented, the complex exponential generator 300 effectively draws the sin/cos in the first quadrant and samples it using 256 equally spaced points then connect the dots with straight lines. In other embodiments, a higher order interpolator ($2^{nd}$ or $3^{rd}$ order) could be used to improve accuracy. Another alternative would be to use a recursive algorithm such as the CORDIC (COordinate Rotation DIgital Computer) algorithm to generate $e^{j2\pi\alpha_1}$.

Depending on the input values k, $f_0$, θ, v provided to the first frequency generator stage 281 and second vector phase accumulator stage 282, the EVGU hardware/firmware structure 260 may be used to generate complex exponential vector sequences for either time or frequency domain applications. For example, with frequency domain applications, the vector length parameter v may be set to a first value (e.g., v =32) to specify the number of radix-2 butterflies performed on each clock cycle in the vector data path, or may be set to a second value for mixed radix modes (e.g., v =1 for selected stages using a divide and conquer algorithm, or v =64 for a general case). With frequency domain applications, the initial phase parameter may be set to θ=0, and the base frequency parameter $f_0$ may be set to the 1/N (where N is the maximum FFT or DFT block size), and k may be set to the twiddle factor spacing multiple, which changes on each stage of DFT/FFT. And for time domain applications (e.g., numerically controlled oscillator (NCO) applications), the vector length parameter v may be set to specify the number of complex multiplies enabled in the vector data path (e.g., v=64), the initial phase parameter θ may be set to the initial phase input value, the base frequency parameter $f_0$ may be set to the desired frequency for the NCO, and k may be set to k=1.

Though the description provided hereinabove is presented with reference to selected signal transmission embodiments in which one or more exponential vector generation units may be used, it will be appreciated that selected embodiments may deploy one or more exponential vector generation units in connection with signal reception processing where exponential vectors and time domain mixers (for example) may also be used.

In selected embodiments, the input values k, $f_0$, θ, v to the EVGU hardware/firmware structure 260 may be programmably adjusted to control the generation of complex exponential vector sequences for either time or frequency domain applications. To this end, at least a first predetermined programming instruction may be used to program the integrated exponential vector generator unit (EVGU) 224 with a first plurality of parameter input values to generate a plurality of complex exponentials in the frequency domain that may be used as twiddle factors to compute a Fourier transform. For frequency domain applications, the first predetermined programming instruction may be used to program the scalar phase accumulator with a vector length parameter v, to program the output buffer with an initial phase parameter θ=0, and to program the frequency multiplier with multiplicand parameter k corresponding to the twiddle factor spacing multiple and the base frequency parameter $f_0$.

In selected embodiments, the EVGU 224 may generate twiddle factors based on inputs from control unit 227. In one embodiment, the EVGU 224 may receive one or more setup instructions and optionally one or more additional run instructions. As part of the setup instruction, EVGU 224 may receive a very long instruction word (VLIW) instruction to configure and/or modify one or more of the input values k, $f_0$, θ, v. Examples of such instruction include a twiddle.counter.set instruction or a twiddle.counter.k instruction, twiddle.counter.k.incr instruction, and/or twiddle.counter.delta instruction. The twiddle.counter.set instruction may program all relevant input values k, $f_0$, θ, v for the EVGU 224 required to generate complex exponential twiddle factors. In addition, the twiddle.counter.k instruction may program only a k value, while the twiddle.counter.k.incr instruction programs the increment value of k, and the twiddle.counter.delta instruction sets the value of k, and the twiddle factor mode indicating the number of output twiddle factors per cycle. When programmed in this configuration, the EVGU 224 generates twiddle factors $W(k)=e^{-j2\pi ki/N}$, where N is the maximum FFT or DFT block size (e.g., $N=2^{12} \cdot 3^5 \cdot 5^2$); i=0, 1, 2, . . . , and k is an input parameter specifying the twiddle factor spacing multiple.

When implementing a frequency domain application, such as a Fourier transform, the arithmetic unit 228 may receive an input time domain signal from register file 229. Using real and imaginary components of the twiddle factors generated by the EVGU 224, the arithmetic unit 228 may generate a frequency domain signal corresponding to the time domain signal. In this example, the input time domain signal may be any communication signal, such as a QAM modulated communication signal, and the EVGU 224 is programmed to produce twiddle factors that are used to precode the time domain signal to generate a precoded signal. By way of example, the precoded communication signal may be provided by user equipment (UE) that incorporates the EVGU 224 and a DFT algorithm implemented in the arithmetic unit 228. The UE may communicate using the precoded signal for an uplink transmission to a base station. For example, the TWF-programmed EVGU 224 may be used to automatically generate eight parallel streams of twiddle factors during the FFT/DFT operation. The twiddle factors are fed to a multiplexer in the arithmetic unit 228 and are used as multiplying factors.

To reduce processing cycles, the instruction set may be provided with a single instruction to set the input parameter values k, $f_0$, and v for radix-2 FFT operations and to clear the θ input parameter value. In addition or in the alternative, the instruction set may be provided with a single instruction to modify the k input parameter value in parallel with data path butterfly operation, thereby eliminating overhead on stage transitions. Also, the instruction set may be provided with a single instruction to load frequency values in parallel with data path instructions.

In other embodiments, at least a second predetermined programming instruction may be used to program the integrated exponential vector generator unit (EVGU) 224 with a second plurality of parameter input values to generate a plurality of complex exponentials in the time domain. In selected embodiments, the EVGU 224 may receive one or more setup instructions and optionally one or more additional run instructions which configure the EVGU 224 to generate complex exponential waveforms for time domain applications. As a result, the EVGU 224 may be programmed to function as a numerically controlled oscillator, Generalized Chirp-Like (GCL) sequence generator, or a time domain mixer. For such time domain applications, the second predetermined programming instruction may be used to program the scalar phase accumulator with a vector length parameter v, to program the output buffer with an initial phase parameter θ, and to program the frequency multiplier with multiplicand parameter k=1 and the desired frequency parameter $f_0$.

To reduce processing cycles, the instruction set may be provided with a single instruction to set the input parameter values k, $f_0$, and v for numerically controlled oscillator (NCO) operations. In addition or in the alternative, the instruction set may be provided with a single instruction to save and/or load the θ input parameter phase value for an NCO application. Also, the instruction set may be provided with a single instruction to load frequency values in parallel with data path instructions.

Figure 4:
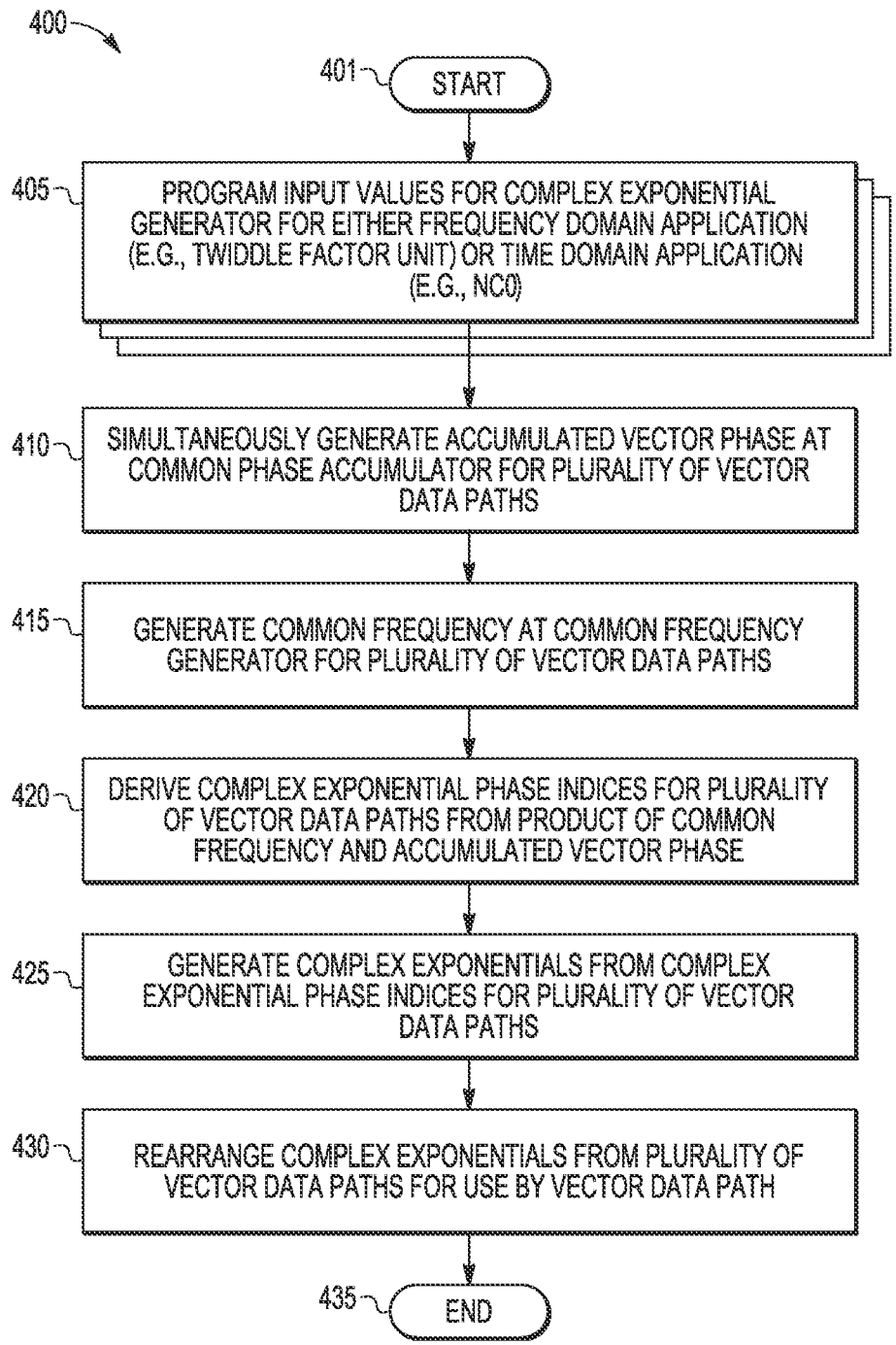
FIG. 4 shows an example flow diagram of a method for configuring and using an exponential vector generator to generate complex exponentials in either the frequency or time domain.

Referring now to FIG. 4, there is depicted an example flow diagram 400 of a method for configuring and using an exponential vector generator to generate complex exponentials in either the frequency or time domain in accordance with selected embodiments of the present disclosure. In the flow diagram 400, the method steps may be performed by programmable complex exponential vector generator hardware or firmware having a common frequency generator and vector phase accumulator stages which are controlled by control logic (e.g., at the DFE) and connected as inputs to vector element multipliers to generate complex exponential phase index values that are processed by a complex exponential generator stage to output complex exponential values (e.g., $e^{j2\pi\alpha_0}, e^{j2\pi\alpha_1}, \ldots e^{j2\pi\alpha_{v-1}}$). The disclosed methods provide a compact, fast, and power efficient mechanism for generating complex exponentials for either frequency domain or time domain applications, depending on the input parameters programmed into the programmable complex exponential vector generator hardware/firmware.

Once the method starts at step 401, input parameter storage registers are initialized at step 405 with input values so that the complex exponential vector generator computes complex exponentials for either frequency domain or time domain applications. For example, the programmable complex exponential vector generator may be programmed with a first plurality of input values to generate a plurality of complex exponentials in the frequency domain that may be used as twiddle factors to compute a Fourier transform. Alternatively, the programmable complex exponential vector generator may be programmed with a second plurality of input values to generate a plurality of complex exponentials in the time domain (e.g., an NCO application).

At step 410, the common vector phase accumulator stage simultaneously generates accumulated vector phases for a plurality of vector element paths. With a single common vector phase accumulator stage shared by all vector element paths, the circuit size, power consumption, and complexity is reduced. Depending on the programmed input values, the common vector phase accumulator stage may generate an accumulated vector length over a plurality of n cycles based on an initial phase parameter $\theta$ which is then applied in parallel to adders along each vector element path.

At step 415, the common frequency generator stage generates a common frequency for the plurality of vector element paths, thereby reducing the circuit size, power consumption, and complexity. Depending on the programmed input values, the common frequency generator stage may generate a fixed frequency $f=f_0$ over a plurality of n cycles when programmed for time domain applications. However, when programmed for frequency domain applications, the common frequency generator stage may generate a dynamic frequency $f=k \cdot f_0$ where the k input parameter value may be modified in parallel with data path butterfly operation.

At step 420, the complex exponential phase indices are derived for the plurality of vector data paths from product of common frequency and accumulated vector phase. For frequency domain applications, the complex exponential phase index $\alpha_i$ for vector element path i may be computed as $\alpha_i = k \cdot f_0 \cdot (i + v \cdot n)$, with k specifying an FFT stage index value (e.g., 0, 1, 2, ...), $f_0$ specifying a frequency spacing for FFT, v specifying a vector length, and n specifying the cycle index, starting with 0. For time domain applications, the complex exponential phase index $\alpha_i$ for vector element path i may be computed as $\alpha_i = f_0 \cdot (\theta + i + v \cdot n)$, with $f_0$ specifying a desired frequency, $\theta$ specifying a phase parameter, v specifying a vector length, and n specifying the cycle index, starting with 0.

At step 425, the complex exponential phase indices are used to generate complex exponentials for the vector element paths. As described herein, a bank of complex exponential generators may use tables, multipliers, and adders at each generator to generate the complex exponentials. At step 430, a permutation unit re-arranges the complex exponentials from the plurality of vector element paths for use by a vector data path. At step 435, the method ends.

As will be appreciated, the programmable complex exponential vector generator mechanism, system and methodology described herein efficiently provide complex exponentials for either frequency domain or time domain applications, depending on the input parameters programmed into the programmable complex exponential vector generator hardware/firmware. Though the programmable complex exponential vector generator mechanism may be embodied in hardware with multiplier and accumulator stages arranged to derive complex exponential phase indices from the product of frequency and vector phase accumulators with storage flop devices for holding intermediate computation results, selected aspects of the programmable complex exponential vector generator mechanism may be programmed or loaded by processing circuitry (e.g., a processor or controller) executing software (e.g., including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-readwrite (CD-R/W) and DVD. Thus, some of the disclosed embodiments, as applicable, may be implemented using a variety of different information processing systems. For example, although FIG. 2 depicts an exemplary signal processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

By now it should be appreciated that there has been provided a reconfigurable complex exponential vector sequence generator and associated method of operation. As disclosed, the reconfigurable generator includes a frequency generator stage, vector phase accumulator stage, vector element multiplier(s), and complete exponential generator stage. The frequency generator stage includes a multiplier for multiplying first and second programmable input frequency parameters to generate an output frequency value, where the output frequency value has a fixed value for time domain applications and has a changing value for frequency domain applications. In selected embodiments, the frequency generator stage is a single frequency generator stage shared in common with the one or more vector element multipliers. In other embodiments, the frequency generator stage may include a first input register (for storing a first programmable input frequency parameter k) and a second input register (for storing a second programmable input frequency parameter $f_0$) so that the multiplier generates an output frequency value having a fixed value $f_0$ for time domain applications, and generates an output frequency value having a changing value $k \cdot f_0$, for frequency domain applications. The vector phase accumulator stage includes an accumulator for adding a programmable vector length input parameter to a programmable output from the accumulator to generate an accumulator output that is supplied to a plurality of different vector element paths to generate a plurality of vector phase accumulator values, where each vector phase accumulator value is computed as a first value for time domain applications and is computed as a second value for frequency domain applications. In selected embodiments, the vector phase accumulator stage is a single vector phase accumulator stage shared in common with the plurality of different vector element paths. In other embodiments, the vector phase accumulator stage may include a first vector parameter register (for storing an initial phase parameter θ) and a second vector parameter register (for storing the programmable vector length input parameter v and for storing and for storing the accumulator output), so that the accumulator generates an accumulator output at each vector element path having a first value (i+v·n) for frequency domain applications at each clock cycle n, and generates an accumulator output at each vector element path i having a second value θ+i+v·n for frequency domain applications at each clock cycle n. In selected embodiments, the vector phase accumulator stage may also include a plurality of adders connected in the plurality of different vector element paths, where each adder is coupled to receive the accumulator output as a first input and to receive a vector element path index as a second input such that the plurality of adders generate the plurality of vector phase accumulator value. The vector element multiplier(s) is coupled to receive the output frequency value and the plurality of vector phase accumulator values, and generates therefrom a complex exponential phase index value $α_i$ for each of the different vector element paths. In selected embodiments, the vector element multipliers include a plurality of vector element multipliers coupled in the vector element paths to receive the output frequency value and the plurality of vector phase accumulator values. The complex exponential generator stage is coupled to receive the complex exponential phase index value $α_i$ for each vector element path and to compute therefrom a plurality of complex exponential values. In selected embodiments, the complex exponential generator stage may include a plurality of complex exponential generators coupled in the vector element paths to receive the complex exponential phase index value $α_i$ for each vector element path i and to compute therefrom a complex exponential values $e^{j2\pi α_i}$. The reconfigurable complex exponential vector sequence generator may also include a permutation unit coupled to receive and rearrange the plurality of complex exponential values for use by vector data path in a single-instruction-stream, multiple-data-stream (SIMD) processor.

In another form, there is provided a method for use in a data processing system to generate complex exponential values with a programmable complex exponential sequence generator. In the disclosed methodology, the complex exponential sequence generator is programmed with input parameter values to generate complex exponential values in either a frequency domain or time domain. From the input parameter values, complex exponential phase index values are derived and used to generate complex exponential values which may be rearranged into a vector format. When deriving the plurality of complex exponential phase index values $α_i$, a complex product may be computed from a frequency value f and plurality of vector phase accumulator values derived from the input parameter values θ, v. For example, the frequency value f may be computed by multiplying first and second programmable input frequency parameters k, $f_0$, where the frequency value f has a fixed value for time domain applications and has a changing value for frequency domain applications. In addition, the vector phase accumulator values may be computed using an accumulator to add a programmable vector length input parameter v to a programmable output from the accumulator to generate an accumulator output that is supplied to a plurality of different vector element paths to generate the plurality of vector phase accumulator values, where each vector phase accumulator value is computed as a first value for time domain applications and is computed as a second value for frequency domain applications. In selected embodiments, the plurality of complex exponential phase index values are derived from a common frequency generator stage and a common vector phase accumulator stage shared in common with a plurality of vector element multipliers which compute the plurality of complex exponential phase index values. In other embodiments, the plurality of complex exponential values are generated by applying the plurality of complex exponential phase index values to a bank of complex exponential generators, each of which extracts a first plurality of bits from a received complex exponential phase index value to index into a pair of slope and intercept tables for generating a pair of slope and intercept values, which multiplies the slope values with an extracted second plurality of bits from the received complex exponential phase index value to compute a pair of product values, and which adds the pair of product values to a shifted pair of intercept values to compute I and Q values.

In yet another form, there is provided a device for generating a complex exponential sequence vector suitable for either frequency domain or time domain applications. As disclosed, the device includes a frequency generator stage, vector phase accumulator stage, vector element multiplier stage, complex exponential generator stage, and permutation stage. The frequency generator stage may include a first multiplier coupled to receive first and second multiplier operands from first and second clocked latch circuits, where the first multiplier receives a programmable input frequency parameter $f_0$ from the first clocked latch circuit and a programmable input frequency parameter k from the second clocked latch circuit and generates a product of the first and second multiplier operands at a frequency stage output over a plurality of clock cycles. The vector phase accumulator stage for generating a plurality of vector phase accumulator values may include an accumulator coupled to receive a first and second addition operands from third and fourth clocked latch circuits, where the accumulator receives a programmable vector length parameter v from the third clocked latch circuit and receives a programmable phase parameter from the fourth clocked latch circuit and generates a sum of the first and second addition operands for storage in the third clocked latch circuit over the plurality of clock cycles. In addition, the vector phase accumulator stage may include a plurality of different vector element paths comprising a plurality of adders, each of which receives a first addition operand from the third clocked latch circuit and receives a second addition operand corresponding to a vector element index value for the vector element path, thereby generating the plurality of vector phase accumulator values. The vector element multiplier stage may include a plurality of multipliers connected, respectively, to the plurality of different vector element paths, where each multiplier receives the frequency stage output as a first multiplicand operand and receives a vector phase accumulator value as a second multiplicand operand, thereby generating a plurality of complex exponential phase index values $(\alpha_0, \alpha_1, \ldots \alpha_{v-1})$. The complex exponential generator stage is coupled to receive the plurality of complex exponential phase index values and to compute therefrom a plurality of complex exponential values (e.g., $e^{j2\pi\alpha_0}, \ldots e^{j2\pi\alpha_{v-1}}$). In selected embodiments, the complex exponential generator stage includes a plurality of complex exponential generators, each of includes an input register for receiving an input complex exponential phase index value; first and second slope tables coupled to be indexed by a first plurality of bits from the input complex exponential phase index value for generating first and second slope values; first and second intercept tables coupled to be indexed by the first plurality of bits from the input complex exponential phase index value for generating first and second intercept values; first and second shifters coupled to generated first and second shifted intercept values; first and second multipliers coupled to multiply the first and second slope values with a second plurality of bits from the input complex exponential phase index value, thereby generating first and second product values: and first and second adders coupled to add the first and second shifted intercept values with the first and second product values corresponding, respectively to I and Q values. Finally, the permutation stage is coupled to arrange the plurality of complex exponential values (e.g., $e^{j2\pi\alpha_0}, e^{j2\pi\alpha_1}, \ldots e^{j2\pi\alpha_{v-1}}$) for use by a vector data path. In selected embodiments, the clocked latch circuits are programmed with input parameter values k, $f_0$, v for frequency domain applications so that the plurality of complex exponential phase index values $\alpha_i$ for vector element path i are computed as $\alpha_i = k \cdot f_0 \cdot (i+v \cdot n)$, with k specifying an FFT stage index value (e.g., 0, 1, 2, . . . ), $f_0$ specifying a frequency spacing for FFT, v specifying a vector length, and n specifying the cycle index, starting with 0. In other embodiments, the clocked latch circuits are programmed with input parameter values k, $f_0$, v, θ for time domain applications so that the plurality of complex exponential phase index values $\alpha_i$ for vector element path i are computed as $\alpha_i = f_0 \cdot (\theta + i + v \cdot n)$, with $f_0$ specifying a desired frequency, θ specifying a phase parameter, v specifying a vector length, and n specifying the cycle index, starting with 0.

Although the described exemplary embodiments disclosed herein are directed to hardware-based methods and systems for efficiently generating complex exponentials, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A complex exponential vector sequence generator, comprising:
    a frequency generator stage comprising a multiplier for multiplying first and second programmable input frequency parameters to generate an output frequency value, where the output frequency value has a fixed value for time domain applications and has a changing value for frequency domain applications;
    a vector phase accumulator stage comprising an accumulator for adding a programmable vector length input parameter to a programmable output from the accumulator to generate an accumulator output that is supplied to a plurality of different vector element paths to generate a plurality of vector phase accumulator values, where each vector phase accumulator value is computed as a first value for time domain applications and is computed as a second value for frequency domain applications;
    one or more vector element multipliers coupled to receive the output frequency value and the plurality of vector phase accumulator values, and to generate therefrom a complex exponential phase index value for each of the different vector element paths; and
    a complex exponential generator stage coupled to receive the complex exponential phase index value for each vector element path and to compute therefrom a plurality of complex exponential values.

2. The complex exponential vector sequence generator of claim 1, where the frequency generator stage is a single frequency generator stage shared in common with the one or more vector element multipliers.

3. The complex exponential vector sequence generator of claim. 1,
    Where the frequency generator stage comprises a first input register for storing a first programmable input frequency parameter k and a second input register for storing a second programmable input frequency parameter $f_0$), so that the multiplier generates an output frequency value having a fixed value $f_0$ for time domain applications, and generates an output frequency value having a changing value k $\cdot f_0$ for frequency domain applications.

4. The complex exponential vector sequence generator of claim 1, where the vector phase accumulator stage is a single vector phase accumulator stage shared in common. with the plurality of different vector element paths.

5. The complex exponential vector sequence generator of claim 1, where the vector phase accumulator stage comprises a first vector parameter register for storing an initial phase parameter θ, and a second vector parameter register for storing the programmable vector length input parameter v and for storing the accumulator output, so that the accumulator generates an accumulator output at each vector element path i having a first value (i +v*n) for frequency domain applications at each clock cycle n, and generates an accumulator output at each vector element, path i having a second value θ+i +v*n for frequency domain applications at each clock cycle n.

6. The complex exponential vector sequence generator of claim 1, where the vector phase accumulator stage comprises a plurality of adders connected in the plurality of different vector element paths, here each adder is coupled to receive the accumulator output as a first input and to receive a vector element path index as a second input such that the plurality of adders generate the plurality of vector phase accumulator values.

7. The complex exponential vector sequence generator of claim 1, where the one or more vector element multipliers comprises a plurality of vector element multipliers coupled in the vector element paths to receive the output frequency value and the plurality of vector phase accumulator values.

8. The complex exponential vector sequence generator of claim 1, where the complex exponential generator stage comprises a plurality of complex exponential generators coupled in the vector element paths to receive a complex exponential phase index value $\alpha_i$ for each vector element path i and to compute therefrom a complex exponential values $e^{j2\pi\alpha_i}$.

9. The complex exponential vector sequence generator of claim 1, further comprising a permutation unit coupled to receive and rearrange the plurality of complex exponential values for use by vector data path in a single-instruction-stream, multiple-data-stream (SIMD) processor.

10. In a data processing system, a method for generating a plurality of complex exponential values with a programmable complex exponential sequence generator, comprising:
programming the complex exponential sequence generator with input parameter values to generate complex exponential values;
deriving a plurality of complex exponential phase index values in parallel from the input parameter values and
generating a plurality of complex exponential values from the plurality of complex exponential phase index values, wherein deriving the plurality of complex exponential phase index values comprises computing, using a plurality of multipliers, a plurality of complex products of a frequency value and plurality of vector phase accumulator values derived from the input parameter values.

11. The method of claim 10, further rearranging the plurality of complex exponential values into a vector format.

12. The method of claim 10, further comprising multiplying first and second programmable input, frequency parameters to generate the frequency value, where the frequency value has a fixed value for time domain applications and has a changing value for frequency domain applications.

13. The method of claim 10, further comprising using an accumulator to add a programmable vector length input parameter to a programmable output from the accumulator to generate an accumulator output that is supplied to a plurality of different vector element paths to generate the plurality of vector phase accumulator values, where each vector phase accumulator value is computed as a first value for time domain applications and is computed as a second value for frequency domain applications.

14. The method of claim 10, where the plurality of complex exponential phase index values are derived from a common frequency generator stage and a common vector phase accumulator stage shared in common with a plurality of vector element multipliers which compute the plurality of complex exponential phase index values.

15. The method of claim 10, where generating the plurality of complex exponential values comprises applying the plurality of complex exponential phase index values to a bank of complex exponential generators, each of which extracts a first plurality of bits from a received complex exponential phase index value to index into a pair of slope and intercept tables for generating a pair of slope and intercept values, which multiplies the slope values with an extracted second plurality of hits from the received complex exponential phase index value to compute a pair of product values, and which adds the pair of product values to a shifted pair of intercept values to compute I and Q values.

16. The method of claim 10, where programming the complex exponential sequence generator comprises programming input parameter values to generate complex exponential values in a frequency domain.

17. The method of claim 10, where programming the complex exponential sequence generator comprises programming input parameter values to generate complex exponential values in a time domain.

18. A device for generating a complex exponential sequence vector suitable for either frequency domain or time domain applications, comprising:
a frequency generator stage comprising a first multiplier coupled to receive first and second multiplier operands from first and second clocked latch circuits, where the first multiplier receives a programmable input frequency parameter $f_0$ from the first clocked latch circuit and a programmable input frequency parameter k from the second docked latch circuit and generates a product of the first and second multiplier operands at a frequency stage output over a plurality of clock cycles;
a vector phase accumulator stage for generating, a plurality of vector phase accumulator values, comprising:
an accumulator coupled to receive a first and second addition operands from third and fourth clocked latch circuits, where the accumulator receives a programmable vector length parameter v from the third clocked latch circuit and receives a programmable phase parameter θ from the fourth clocked latch circuit and generates a sum of the first and second addition operands for storage in the third clocked latch circuit over the plurality of clock cycles, and
a plurality of different vector element paths comprising a plurality of adders, each of which receives a first addition operand from the third clocked latch circuit and receives a second addition operand corresponding to a vector element index value for the vector element path, thereby generating the plurality of vector phase accumulator values;
a vector element multiplier stage comprising a plurality of multipliers connected, respectively, to the plurality of different vector dement paths, where each multiplier receives the frequency stage output as a first multiplicand operand and receives a vector phase accumulator value as a second multiplicand operand, thereby generating, a plurality of complex exponential phase index values;
a complex exponential generator stage coupled to receive the plurality of complex exponential phase index values and to compute therefrom a plurality of complex exponential values; and
a permutation stage coupled to arrange the plurality of complex exponential values for use by a vector data path.

19. The device of claim 18, where the clocked latch circuits are programmed with input parameter values k, $f_0$, v for frequency domain applications so that the plurality of complex exponential phase index values $\alpha_i$ for vector element path i are computed as $\alpha_i = k*f_0*(i+v*n)$, with k specifying an FFT stage index value (e.g., 0, 1, 2, . . .), $f_0$ specifying a frequency spacing for FFT, v specifying a vector length, and n specifying the cycle index, starting with 0.

20. The device of claim 18, where the docked latch circuits are programmed with input parameter values k, $f_0$, v, θ for time domain applications so that the plurality of complex exponential phase index values $\alpha_i$ for vector element path i are computed as $\alpha_i = k*f_0*(\theta+i+v*n)$, with $f_0$ specifying a desired frequency, θ specifying a phase parameter, v specifying a vector length, and n specifying the cycle index, starting with 0.

21. The device of claim 18, where the complex exponential generator stage comprises a plurality of complex exponential generators, each of which comprises:
- an input register for receiving an input complex exponential phase index value: first and second slope tables coupled to be indexed by a first plurality of bits from the input complex exponential phase index value for generating first and second slope values;
- first and second intercept tables coupled to be indexed by the first plurality of bits from the input complex exponential phase index value for generating first and second intercept values; first and second shifters coupled to generate first and second shifted intercept values;
- first and second multipliers coupled to multiply the first and second slope values with a second plurality of bits from the input complex exponential phase index value, thereby generating first and second product values; and
- first and second adders coupled to add the first and second shifted intercept values with the first and second product values corresponding, respectively to I and Q values.

* * * * *

UNITED STATES PATENT AND TRADEMARK OFFICE
CERTIFICATE OF CORRECTION

PATENT NO. : 9,087,003 B2  
APPLICATION NO. : 13/666289  
DATED : July 21, 2015  
INVENTOR(S) : Leo G. Dehner and Oded Yishay Page 1 of 1

It is certified that error appears in the above-identified patent and that said Letters Patent is hereby corrected as shown below:

In the Claims

Col. 16, lines 46-47 should read: "claim 1, where the frequency generator stage comprises a first"

Col. 17, line 8 should read: "vector element paths, where each adder is coupled to receive the"

Col. 18, line 28 should read: "second clocked latch circuit and generates a product of"

Col. 18, line 51 should read: "different vector element paths, where each multiplier"

Col. 19, line 5 should read: "20. The device of claim 18 where the clocked latch circuits"

Signed and Sealed this  
Seventeenth Day of November, 2015

Michelle K. Lee  
*Director of the United States Patent and Trademark Office*